US012755631B2

(12) United States Patent
Hu et al.

(10) Patent No.: US 12,755,631 B2
(45) Date of Patent: Oct. 6, 2026

(54) MIXED TRAFFIC FLOW-ORIENTED VEHICLE ECO-DRIVING CONTROL METHOD AND ELECTRONIC DEVICE

(71) Applicant: ZHEJIANG UNIVERSITY, Hangzhou (CN)

(72) Inventors: Simon Hu, Hangzhou (CN); Qishen Zhou, Hangzhou (CN); Jianghan Hu, Hangzhou (CN); Bin Zhou, Hangzhou (CN); Der-Horng Lee, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 209 days.

(21) Appl. No.: 18/698,351

(22) PCT Filed: Dec. 8, 2023

(86) PCT No.: PCT/CN2023/137304
§ 371 (c)(1),
(2) Date: Apr. 3, 2024

(87) PCT Pub. No.: WO2025/000916
PCT Pub. Date: Jan. 2, 2025

(65) Prior Publication Data
US 2025/0232670 A1 Jul. 17, 2025

(30) Foreign Application Priority Data
Jun. 26, 2023 (CN) ........................ 202310757724.X

(51) Int. Cl.
*G08G 1/0967* (2006.01)
*G08G 1/16* (2006.01)

(52) U.S. Cl.
CPC ....... *G08G 1/096725* (2013.01); *G08G 1/166* (2013.01)

(58) Field of Classification Search
CPC ............. G08G 1/096725; G08G 1/166; G08G 1/0145; G08G 1/0129; G08G 1/0137; Y02T 10/40
See application file for complete search history.

(56) References Cited

U.S. PATENT DOCUMENTS 11,631,325 B2 * 4/2023 Bai ........................ G06N 20/00 701/24
12,467,766 B2 * 11/2025 Beaurepaire ....... G01C 21/3815
(Continued)

FOREIGN PATENT DOCUMENTS

CN 105355044 B * 8/2017 ........... G08G 1/0145
CN 111833619 A * 10/2020 ............. G08G 1/085
(Continued)

OTHER PUBLICATIONS

CN-117636628-A translation (Year: 2024).*
(Continued)

*Primary Examiner* — Kyle T Johnson
(74) *Attorney, Agent, or Firm* — ARC IP Law, PC; Joseph J. Mayo

(57) ABSTRACT

A mixed traffic flow-oriented vehicle eco-driving control method and an electronic device are provided. The method includes: calculating a gathering wave speed and a dissipation wave speed at an intersection, and obtaining a farthest queue point position of a connected and autonomous vehicle at a downstream intersection and a time acquiring predicted trajectories of the manual-driving vehicle; constructing and solving an optimal ecological reference trajectory planning model of the connected and autonomous vehicle, obtaining an acceleration curve of the connected and autonomous vehicle, and acquiring an ecological reference trajectory of the connected and autonomous vehicle; and setting a risk factor based on the predicted trajectories of the manual-driving vehicles, constructing a tracking target based on the
(Continued)

risk factor and the ecological reference trajectory, using a model predictive control for solving, and obtaining a control input of the connected and autonomous vehicle.

20 Claims, 5 Drawing Sheets

(56) References Cited

U.S. PATENT DOCUMENTS

| | | | | |
|---|---|---|---|---|
| 2017/0301237 | A1* | 10/2017 | MacNeille | H04W 68/005 |
| 2020/0294401 | A1* | 9/2020 | Kerecsen | G08G 1/205 |
| 2021/0125076 | A1* | 4/2021 | Zhang | G06N 3/045 |
| 2022/0388505 | A1* | 12/2022 | Sharma Banjade | G08G 1/096783 |
| 2023/0095384 | A1* | 3/2023 | Sharma Banjade | G08G 1/096725 701/301 |
| 2023/0138163 | A1* | 5/2023 | Sivanesan | G08G 1/162 701/301 |
| 2024/0214786 | A1* | 6/2024 | Sharma Banjade | H04W 4/40 |
| 2024/0355204 | A1* | 10/2024 | Kukishev | G08G 1/166 |
| 2025/0232670 | A1* | 7/2025 | Hu | G08G 1/0145 |

FOREIGN PATENT DOCUMENTS

| | | | | |
|---|---|---|---|---|
| CN | 112885145 A | * | 6/2021 | G08G 1/16 |
| CN | 113393688 | | 9/2021 | |
| CN | 113393688 A | * | 9/2021 | G08G 1/0967 |
| CN | 114495527 | | 5/2022 | |
| CN | 114852076 | | 8/2022 | |
| CN | 114973733 | | 8/2022 | |
| CN | 114613179 B | * | 3/2023 | G08G 1/20 |
| CN | 116524722 | | 8/2023 | |
| CN | 116596185 A | * | 8/2023 | G06Q 10/063 |
| CN | 117636628 A | * | 3/2024 | G08G 1/096833 |
| CN | 119620127 A | * | 3/2025 | G01S 19/215 |

OTHER PUBLICATIONS

CN-112885145-A translation (Year: 2021).*
CN-119620127-A translation (Year: 2025).*
CN-114613179-B translation (Year: 2023).*
CN-116596185-A translation (Year: 2023).*
A_future_intelligent_traffic_system_with_mixed_autonomous_vehicles (Year: 2020).*
Velocity prediction based on vehicle lateral risk assessment and traffic flow (Year: 2021).*
CN-111833619-A translation (Year: 2020).*
CN-113393688-A translation (Year: 2021).*
CN-105355044-B translation (Year: 2017).*
International Search Report issued in PCT/CN2023/137304 on Jan. 22, 2024, and English Translation Thereof.
First Office Action issued in CN 202310757724 on Aug. 7, 2023, and English Translation thereof.

* cited by examiner

MIXED TRAFFIC FLOW-ORIENTED VEHICLE ECO-DRIVING CONTROL METHOD AND ELECTRONIC DEVICE

CROSS REFERENCE TO RELATED APPLICATION

This patent application is a national stage of International Application No. PCT/CN2023/137304, filed on Dec. 8, 2023, which claims the priority of Chinese Patent Application No. 202310757724.X filed in China National Intellectual Property Administration on Jun. 26, 2023 and entitled as "Mixed Traffic Flow-Oriented Vehicle Eco-Driving Control Method and Electronic Device". Both of the aforementioned applications are incorporated by reference herein in their entireties as part of the present application.

TECHNICAL FIELD

The present disclosure relates to the fields of an artificial potential field theory, a traffic flow theory and vehicle motion planning and control, in particular to a mixed traffic flow-oriented vehicle eco-driving control method and an electronic device.

BACKGROUND

In recent years, with the rapid increase in the number of vehicles, the problems of energy consumption and pollutant emission are becoming increasingly prominent. In addition, road vehicles, such as cars, trucks and buses, account for about three-quarters of emissions in the transportation industry. Eco-driving is a strategy to improve the efficiency of energy conservation and emission reductions of a transportation system by changing the driving behavior of vehicles. The basic measure is to provide a real-time driving advice for vehicles to reduce stopping and starting, idling and sharp acceleration/deceleration behaviors. Numerous studies and practices show that eco-driving can reduce fuel consumption and emissions by 3% to 20%. In recent years, with the development of autonomous driving and communication technology, controlling Connected and Autonomous Vehicles (CAVs) to achieve eco-driving is considered as an effective and promising means. Compared with the highway environment, urban road traffic flow is often interrupted by traffic signal lights, and the behavior of vehicles at traffic signal light intersections such as acceleration, deceleration and idling will lead to increased fuel consumption and emissions thereof. Therefore, it is of great significance to develop an eco-driving strategy for the urban road environment.

At present, the existing technology ignores the influence of other social vehicles when studying the eco-driving strategy of Connected and Autonomous Vehicles (CAVs), or is only oriented toward the pure connected and autonomous scenarios. However, it can be predicted that Manual-driving vehicles (MVs) and Connected and Autonomous Vehicles (CAVs) will coexist on the road for a long time, forming a mixed traffic flow.

Therefore, under the background of mixed traffic flow, it is urgent to full consider to the influence of Manual-driving vehicles (MVs) and Connected and Autonomous Vehicles (CAVs) implementing the eco-driving strategies on each other to ensure that the eco-driving strategy will not bring negative safety impact to mixed traffic flow. In addition, it should be emphasized that eco-driving vehicles often slow down vehicles to approach intersections, and such deceleration behavior is unpredictable for drivers of vehicles behind eco-driving vehicles. Therefore, the safety influence of the following vehicles on vehicles implementing the eco-driving strategies cannot be ignored, which has been ignored in many studies and practices.

SUMMARY

The present disclosure aims to be oriented to a mixed traffic flow environment of Manual-driving Vehicles (MVs) and Connected and Autonomous Vehicles (CAVs), and provides a mixed traffic flow-oriented vehicle eco-driving control method and an electronic device.

According to a first aspect of the embodiment of the present disclosure, a mixed traffic flow-oriented vehicle eco-driving control method is provided, where the method includes:

- acquiring signal phase and timing information, historical vehicle state information and real-time vehicle state information; calculating a gathering wave speed and a dissipation wave speed at an intersection based on a shock wave evolution theory, and obtaining a farthest queue point position of a connected and autonomous vehicle at a downstream intersection and a time when a farthest queue is formed;
- predicting a vehicle state and a time when the connected and autonomous vehicle passes through a stop line based on the farthest queue point position of the connected and autonomous vehicle at the downstream intersection and the time when the farthest queue is formed;
- predicting a longitudinal acceleration of a manual-driving vehicle based on a risk field model, so as to acquire predicted trajectories of the manual-driving vehicle;
- taking an instantaneous fuel consumption of the vehicle and a penalty for a state of passing through the stop line as an objective function, setting dynamic constraints and trajectory constraints of the vehicle, constructing and solving an optimal ecological reference trajectory planning model of the connected and autonomous vehicle, and obtaining an acceleration curve of the connected and autonomous vehicle, so as to acquire an ecological reference trajectory of the connected and autonomous vehicle; and
- setting a risk factor according to the risk field model and the predicted trajectories of the manual-driving vehicles before and after the connected and autonomous vehicle, constructing a tracking target based on the risk factor and the ecological reference trajectory, using a model predictive control for solving, and obtaining a control input of the connected and autonomous vehicle.

According to a second aspect of the embodiment of the present disclosure, a mixed traffic flow-oriented vehicle eco-driving control system is provided, which is used to implement the above-mentioned mixed traffic flow-oriented vehicle eco-driving control method, the system includes: a central controller and a plurality of local controllers deployed on the connected and autonomous vehicle;

where the central controller includes:

- a first result acquiring module, configured to acquire signal phase and timing information, historical vehicle state information and real-time vehicle state information; calculate the gathering wave speed and the dissipation wave speed at the intersection based on the shock wave evolution theory, and obtain the farthest queue point position of the connected and autonomous vehicle at the downstream intersection and the time when the farthest queue is formed;

a second result acquiring module, configured to predict the vehicle state and the time when the connected and autonomous vehicle passes through the stop line based on the farthest queue point position of the connected and autonomous vehicle at the downstream intersection and the time when the farthest queue is formed;

a manual-driving vehicle trajectory predicting module, configured to construct a longitudinal acceleration prediction method of the manual-driving vehicle based on the risk field model, so as to acquire the predicted trajectory of the manual-driving vehicle;

a connected and autonomous vehicle trajectory planning module, configured to take the instantaneous fuel consumption of the vehicle and the penalty for the state of passing through the stop line as the objective function, set dynamic constraints and trajectory constraints of the vehicle, construct and solve the optimal ecological reference trajectory planning model of the connected and autonomous vehicle, and obtain the acceleration curve of the connected and autonomous vehicle, so as to acquire the ecological reference trajectory of the connected and autonomous vehicle; and a first communication module, configured to send the ecological reference trajectory of the connected and autonomous vehicle to the local controller;

the local controller includes:

a second communication module, configured to receive the ecological reference trajectory of the connected and autonomous vehicle;

a connected and autonomous vehicle tracking module, configured to set the risk factor according to the risk field model and the predicted trajectories of the manual-driving vehicles before and after the connected and autonomous vehicle, construct the tracking target based on the risk factor and the ecological reference trajectory, use the model predictive control for solving, and obtain the control input of the connected and autonomous vehicle.

According to a third aspect of an embodiment of the present disclosure, there is provided an electronic device including a memory and a processor, where the memory is coupled with the processor; the memory is configured to store program data, and the processor is configured to execute the program data to implement the above-mentioned mixed traffic flow-oriented vehicle eco-driving control method.

According to a fourth aspect of the embodiment of the present disclosure, there is provided a computer-readable storage medium on which a computer program is stored, where the program, when executed by a processor, implements the above-mentioned mixed traffic flow-oriented vehicle eco-driving control method.

Compared with the prior art, the present disclosure has the following beneficial effects. The present disclosure provides a mixed traffic flow-oriented vehicle eco-driving control method. Under the background of mixed traffic flow of Manual-driving vehicles (MVs) and Connected and Autonomous Vehicles (CAVs), the risks brought by manual-driving vehicles in front of and behind connected and autonomous vehicles are considered, and on the premise of ensuring traffic efficiency, the driving risk is reduced at the same time, and the efficiency of energy conservation and emission reduction is improved. The mixed traffic flow-oriented vehicle eco-driving control system according to the present disclosure belongs to a hierarchical distributed architecture. The ecological reference trajectory of the connected and autonomous vehicle is acquired through the central controller. The ecological reference trajectory is solved through the local controller deployed on the connected and autonomous vehicle under the consideration of the risk factors brought by the manual-driving vehicles in front of and behind the connected and autonomous vehicle. Compared with the classical central control mode, the communication cost and the calculation cost of eco-driving are effectively reduced.

BRIEF DESCRIPTION OF THE DRAWINGS

In order to explain the technical solution in the embodiment of the present disclosure more clearly, the drawings needed in the description of the embodiment will be briefly introduced hereinafter. Apparently, the drawings described below are only some embodiments of the present disclosure. Other drawings can be obtained according to these drawings without creative labor for those skilled in the art.

DETAILED DESCRIPTION OF THE EMBODIMENTS

The technical schemes in the embodiments of the present disclosure will be clearly and completely described with reference to the accompanying drawings in the embodiments of the present disclosure hereinafter. Apparently, the described embodiments are only some embodiments of the present disclosure, rather than all of the embodiments. Based on the embodiment of the present disclosure, all other embodiments obtained by those skilled in the art without creative labor belong to the scope of protection of the present disclosure.

It should be noted that features in the following embodiments and implementations can be combined with each other without conflict.

Figure 1:
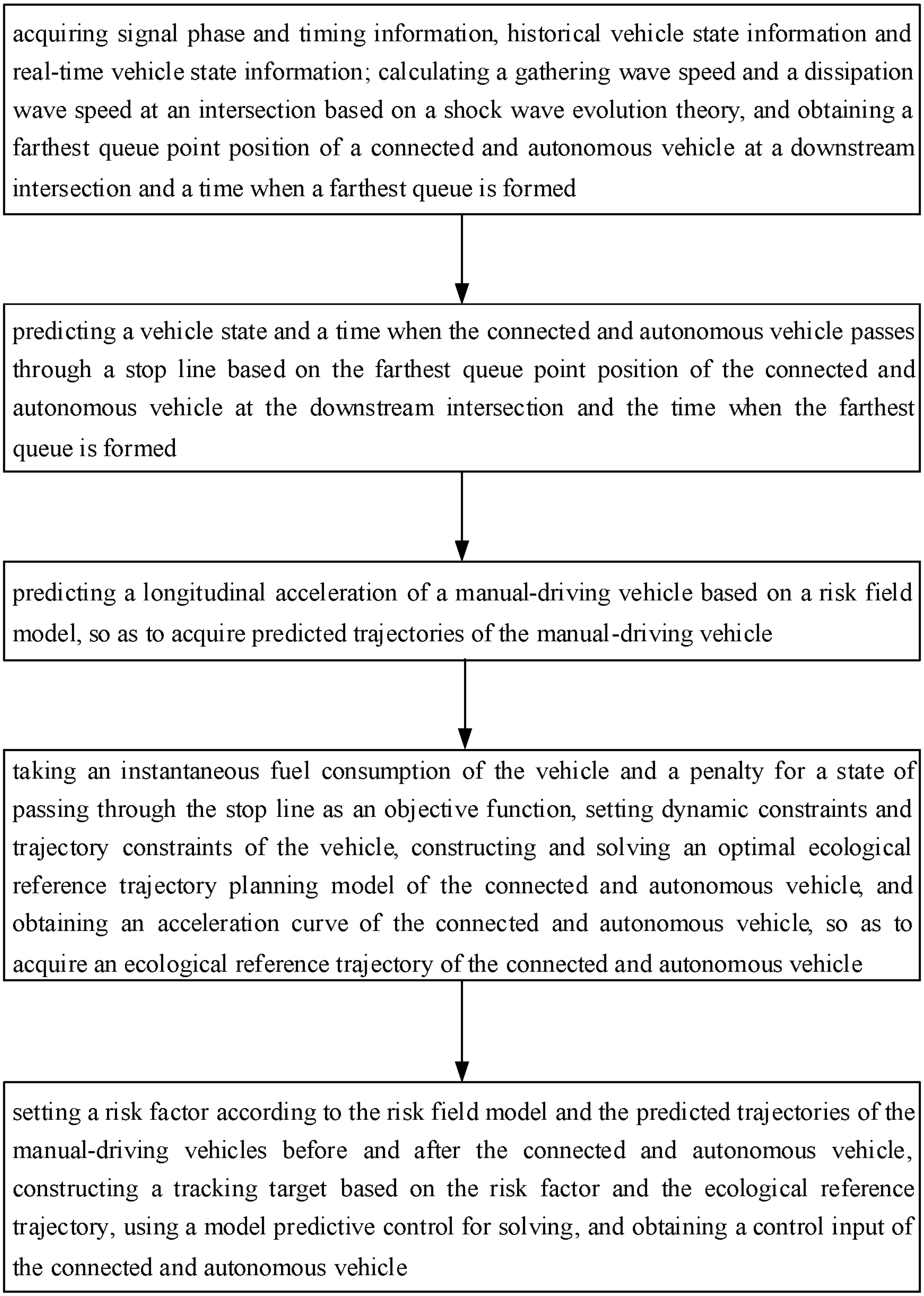
FIG. 1 is a flowchart of a mixed traffic flow-oriented vehicle eco-driving control method according to an embodiment of the present disclosure.
Figure 2:
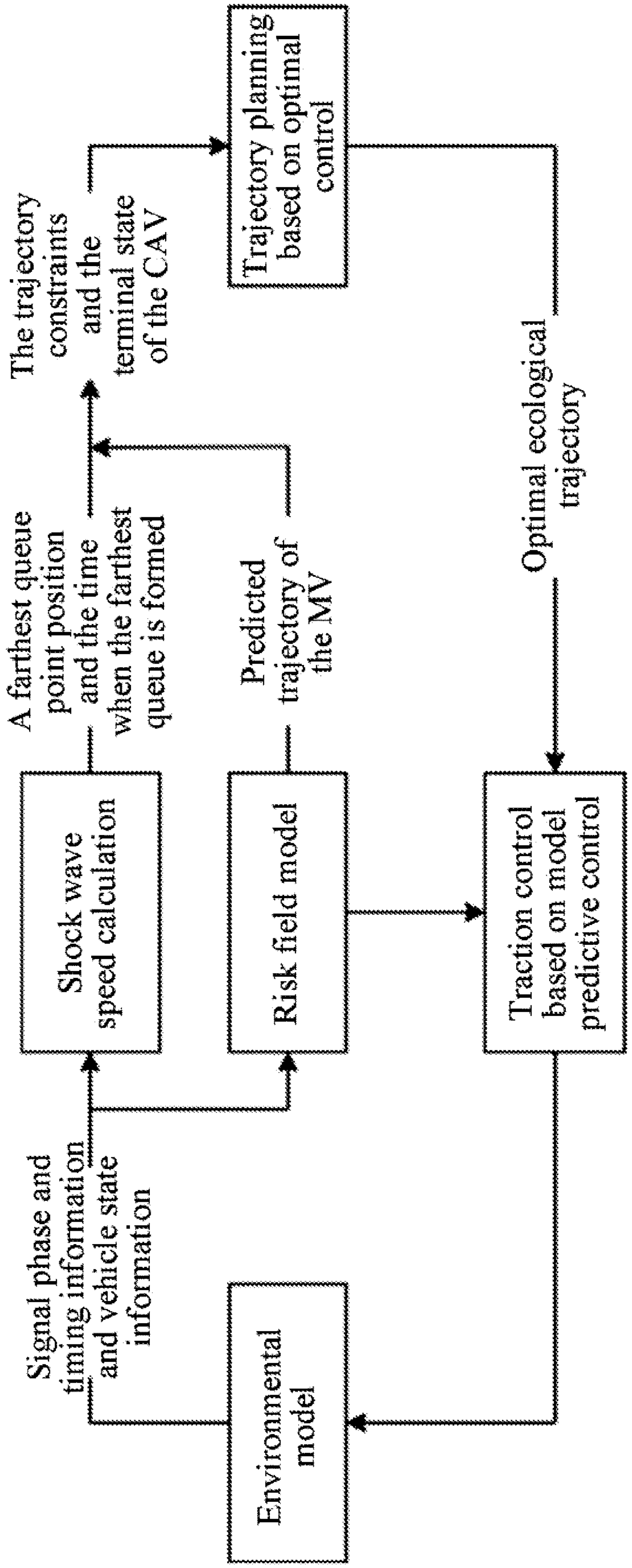
FIG. 2 is a structural block diagram of the mixed traffic flow-oriented vehicle eco-driving control method according to an embodiment of the present disclosure.

As shown in FIG. 1 and FIG. 2, the embodiment of the present disclosure provides a mixed traffic flow-oriented vehicle eco-driving control method, where the method includes the following steps.

Step S1, signal phase and timing information, historical vehicle state information and real-time vehicle state information are acquired; a gathering wave speed and a dissipation wave speed at an intersection are calculated based on a shock wave evolution theory, and a farthest queue point position at which a connected and autonomous vehicle is to be positioned at a downstream intersection and a time when a farthest queue is formed are obtained.

Specifically, the Step S1 specifically includes the following steps.

Step S101, Signal Phase and Timing (SPaT) information, historical vehicle state information and real-time vehicle state information are collected, where the vehicle state information includes a vehicle position, a vehicle speed and a vehicle acceleration.

Step S102, the saturation flow $q_s$, the saturation flow density $\rho_s$ and the congestion flow density $\rho_j$ at the intersection are calibrated according to the historical vehicle state information.

Step S103, the arrival flow $q_a$ and the arrival flow density $\rho_a$ are acquired according to the real-time vehicle state information.

Step S104: the gathering wave speed $w_1$ at the intersection is calculated, in which the expression is as follows:

$$w_1 = (0 - q_a)/(\rho_j - \rho_a).$$

The dissipation wave speed $w_2$ at the intersection is calculated, in which the expression is as follows:

$$w_2 = (q_s - 0)/(\rho_s - \rho_j).$$

The departure wave $w_3$ at the intersection is further calculated as:

$$w_3 = (q_s - q_a)/(\rho_s - \rho_a).$$

Figure 3:
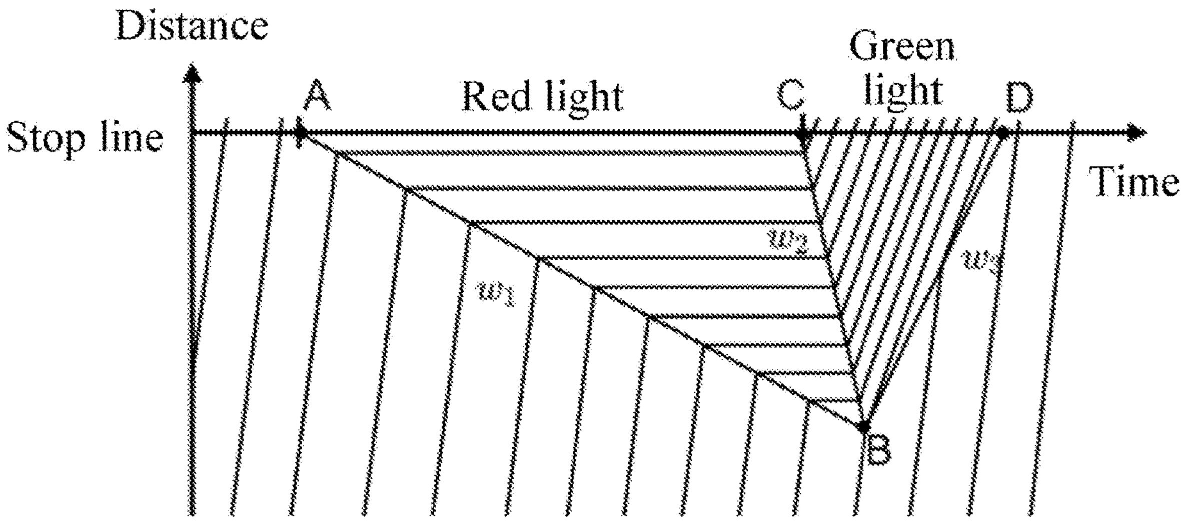
FIG. 3 is a schematic diagram of a queuing evolution and shock waves at an intersection according to an embodiment of the present disclosure.

It should be noted that a schematic diagram of a queuing evolution and shock waves at the intersection is shown in FIG. 3. The gathering wave $w_1$ refers to a shock wave generated when the traffic state changes from the arrival flow to the congestion flow, that is, a straight line AB in FIG. 3. The dissipation wave $w_2$ refers to a shock wave generated when the traffic state changes from the congestion flow to the saturation flow, that is, a straight line BC in FIG. 3. The departure wave $w_3$ refers to a shock wave generated when the traffic state changes from the arrival flow to the saturation flow, that is, a straight line BD in FIG. 3.

Step S105, the queuing situation of vehicles in front of the Connected and Autonomous Vehicle (CAV) is predicted according to the shock wave propagation speed at the intersection and the vehicle state information, to obtain the farthest queue point position $l_{mq}$ at the intersection that the Connected and Autonomous Vehicle (CAV) will face and the time $t_{mq}$ when the farthest queue is formed.

Specifically, a current queue length $L_0$ is acquired according to the signal phase and timing information and the real-time vehicle state information.

The time when the first Connected and Autonomous Vehicle (CAV) enters the intersection is denoted as $t_0$, and the signal will turn green at the time $t_g$ and turn red at the time $t_r$. In order to unify the calculations of the farthest queue point position and the time when the farthest queue is formed under different conditions, it is necessary to adjust the green light start time $t_g$. $t_g'$ indicates the adjusted green light start time, which is calculated by the following formula:

$$t_g' = \begin{cases} t_g, & t_g < t_r \\ t_g - c, & t_g > t_r \end{cases}$$

where c indicates a signal period length.

The adjusted green light start time $t_g'$ is used to calculate a distance $L_{mq}$ between the farthest queue point and the stop line, in which the expression is as follows:

$$L_{mq} = \min\left(w_2 \cdot \frac{w_1(t_g' - t_0) - L_0}{w_2 - w_1}, \frac{N_0}{\rho_j}\right),$$

where $w_1$ is the gathering wave speed, $w_2$ is the dissipation wave speed, $t_g'$ indicates an adjusted green light start time, $t_0$ is a time when a first connected and autonomous vehicle enters the intersection, $\rho_j$ is the congestion flow density, and $N_0$ is a total number of vehicles between the first connected and autonomous vehicle and the stop line.

The farthest queue point position $l_{mq}$ of the connected and autonomous vehicle at the downstream intersection is calculated, in which the expression is as follows:

$$l_{mq} = l_s - L_{mq}.$$

The time $t_{mq}$ when the farthest queue is formed is calculated, in which the expression is as follows:

$$t_{mq} = -L_{mq}/w_2,$$

where $l_s$ indicates a position of the stop line.

Step S2, the time when the connected and autonomous vehicle passes through a stop line and a vehicle state are predicted based on the farthest queue point position of the connected and autonomous vehicle at the downstream intersection and the time when the farthest queue is formed.

It should be noted that in order to ensure the traffic efficiency of the original intersection, it is necessary to predict the time $\tilde{t}_f$ when the Connected and Autonomous Vehicle (CAV) passes through the stop line and the vehicle state $\tilde{x}_f$ (terminal state), where the terminal state $\tilde{x}_f$ includes the position and speed at which the Connected and Autonomous Vehicle (CAV) passes through the stop line. The speed at which the connected and autonomous vehicle passes through the stop line is the speed of the saturation flow. Because vehicles usually pass through intersections where queues are often formed, under saturated traffic conditions, in this example, it is considered that the controlled Connected and Autonomous Vehicle (CAV) should also pass through the intersections at this speed, which not only ensures the original traffic efficiency, but also reduces the speed at which the Connected and Autonomous Vehicle (CAVs) passes through the intersections, thereby further ensuring the safety.

The time $\tilde{t}_f$ when the connected and autonomous vehicle passes through the stop line is acquired, in which the expression is as follows:

$$\tilde{t}_f = t_g' + \left(\frac{L_{mq}}{\rho_j} + 1\right) \cdot \frac{1}{q_s}.$$

The vehicle state $\tilde{x}_f$ that the connected and autonomous vehicle passes through the stop line is acquired, in which the expression is as follows:

$$\tilde{x}_f = [l_s, v_s]^T,\ v_s = \frac{q_s}{\rho_s}.$$

Where $v_s$ indicates the speed at which the connected and autonomous vehicle passes through the stop line, that is, the speed of saturation flow.

Step S3, a longitudinal acceleration prediction method of a manual-driving vehicle is constructed based on a risk field model, so as to acquire a predicted trajectory of the manual-driving vehicle.

The expression is as follows:

$$a^f(t) = \max(a_{min}, \min(a_{max}, g(t)));$$

$$g(t) = l_{i-1}(t) + v_{i-1}(t)\left[T_p - \frac{\eta}{\lambda}\left(\frac{1}{r_d} - 1\right)\right] - l_i(t) - v_i(t)T_p - \frac{1}{\lambda}\left(\frac{1}{r_d} - 1\right) - \frac{L_i + L_{i-1}}{2},$$

where $a^f(t)$ indicates the longitudinal acceleration of the manual-driving vehicle, g(t) indicates an acceleration expected by a driver, $a_{min}$ indicates a minimum acceleration of the vehicle, $a_{max}$ indicates a maximum acceleration of the vehicle, $T_p$ indicates the preview time of the driver, $r_d$ indicates a risk expected by the driver, η indicates an influence factor of the speed on the risk, λ indicates an influence factor of the distance on the risk, l indicates a position of the vehicle, v indicates a speed of the vehicle, L indicates a length of the vehicle, t indicates a time, and i indicates a vehicle serial number, in which the (i−1)th vehicle is in front of the i-th vehicle.

S4, an instantaneous fuel consumption of the vehicle and a penalty for a state of passing through the stop line are taken as an objective function, dynamic constraints and trajectory constraints of the vehicle are set, an optimal ecological reference trajectory planning model of the connected and autonomous vehicle is constructed and solved, and an acceleration curve of the connected and autonomous vehicle is obtained, so as to acquire an ecological reference trajectory of the connected and autonomous vehicle.

The instantaneous fuel consumption of the vehicle and the penalty for the state of passing through the stop line are taken as the objective function, in which the expression is as follows:

$$\underset{a(t)}{\text{minimize}}\ J = \left\|(x(\tilde{t}_f) - \tilde{x}_f)\right\|^2_{Q_f} + \alpha_1 \int_{t_0}^{\tilde{t}_f} L(v(t), a(t), t)dt;$$

where $x(\tilde{t}_f)$ indicates the vehicle state of the connected and autonomous vehicle at the time $\tilde{t}_f$ when the vehicle passes through the stop line; $\tilde{x}_f$ indicates the vehicle state that the connected and autonomous vehicle passes through the stop line;

$$\left\|(x(\tilde{t}_f) - \tilde{x}_f)\right\|^2_{Q_f}$$

indicates the penalty for the state that the connected and autonomous vehicle passes through the stop line; L(v(t), a(t), t) indicates the instantaneous fuel consumption of the vehicle; v(t) indicates the speed of the connected and autonomous vehicle at time t, and a(t) indicates the acceleration of the connected and autonomous vehicle at time t; and each of $Q_f$ and $\alpha_1$ indicates a penalty weight.

In addition, the vehicle movement satisfies the following dynamic formulas and dynamic constraints:

$$\dot{x}(t) = \begin{bmatrix} v(t) \\ a(t) \end{bmatrix}$$

$$0 \le v(t) \le v_{max}$$

$$a_{min} \le a(t) \le a_{max}$$

where $v_{max}$ indicates a road speed limit, $a_{min}$ indicates the minimum acceleration of the vehicle, $a_{max}$ indicates the maximum acceleration of the vehicle, v(t) indicates the speed of the connected and autonomous vehicle at the time t, and a(t) indicates the acceleration of the connected and autonomous vehicle at the time t.

In order to avoid queuing, it is necessary to establish trajectory constraints by using the farthest queue point $l_{mq}$ and the time $t_{mq}$ when the farthest queue is formed obtained based on the Step S1, so that the position of the Connected and Autonomous Vehicle (CAV) at the time $t_{mq}$ is at the upstream of the farthest queue point $l(t_{mq})$, that is:

$$l(t_{mq}) \le_{mq}.$$

Figure 4:
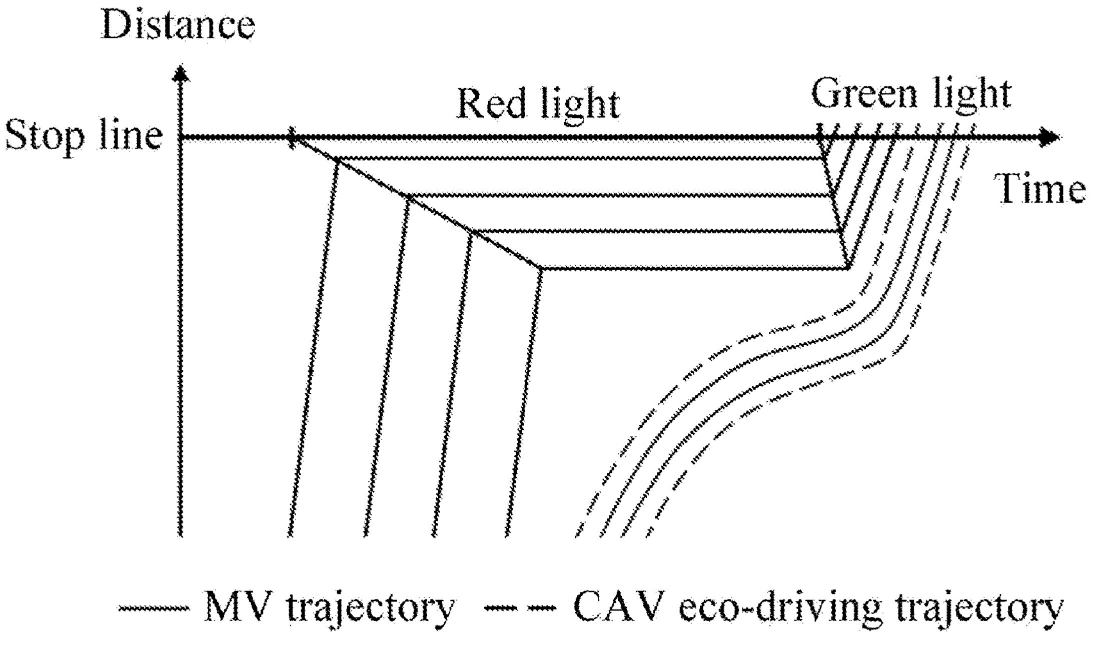
FIG. 4 is a schematic diagram of a queuing evolution when a plurality of eco-driving vehicles coexist at the intersection according to an embodiment of the present disclosure.

Especially, when there is more than one Connected and Autonomous Vehicle (CAV) at the intersection, for the second Connected and Autonomous Vehicle (CAV), the queuing phenomenon at the intersection ahead may be eliminated due to the eco-driving behavior of the first Connected and Autonomous Vehicle (CAV), as shown in FIG. 4. Therefore, for the Connected and Autonomous Vehicle (CAV) after the first vehicle, the predicted trajectory of the Manual-driving vehicle (MV) obtained in the Step S3 will replace the queuing information as the trajectory constraint of the second Connected and Autonomous Vehicle (CAV), namely:

$$l(t) \le l^p(t),$$

where $l^p(t)$ indicates the predicted trajectory of the MV.

After solving the optimal ecological reference trajectory planning model, the acceleration curve a(t) of the Connected and Autonomous Vehicle (CAV) can be obtained, and the ecological reference trajectory $x(t)_{ref}$ of the Connected and Autonomous Vehicle (CAV) can be calculated according to the acceleration curve.

Step S5, a risk factor is set according to the risk field model and the predicted trajectories of the manual-driving vehicles before and after the connected and autonomous vehicle, a tracking target is constructed based on the risk factor and the ecological reference trajectory, Model Predictive Control (MPC) is used for solving, and a control input of the connected and autonomous vehicle is obtained.

Because the eco-driving strategy is usually to slow down the vehicles to approach the intersection, the risks caused by vehicles before and after the Connected and Autonomous Vehicle (CAV) are considered at the same time. In order to enhance the robustness of the control strategy, this embodiment uses Model Predictive Control (MPC) to solve the problem by rolling.

The risks caused by vehicles before and after the Connected and Autonomous Vehicle (CAV) involve the trajectory prediction of vehicles before and after the CAV. In this embodiment, the trajectory of the manual-driving vehicle behind the CAV can be obtained by inputting the planned trajectory of the CAV into the trajectory prediction method in the Step S3. For all manual-driving vehicles in front of the CAV, the predicted trajectory is obtained based on the assumption that the acceleration will remain unchanged for a period of time in the future. According to the predicted trajectories of the manual-driving vehicles in front of and behind the connected and autonomous vehicles, the risk factor $$\xi_i^p x(k+i)$$

of the preceding vehicle and the risk factor $$\xi_i^f (x(k+i))$$

of the following vehicle are set. The risk factor $$\xi_i^s (x(k+i))$$

of a traffic signal light is set according to the signal phase and timing information.

The tracking target and the dynamic constraints of the vehicle are set, and the tracking target and the dynamic constraints of the vehicle are solved to obtain the control input of the connected and autonomous vehicle.

The expression of the tracking target is:

$$\underset{a_k, a_{k+1}, \ldots, a_{k+P-1}}{\text{minimize}} \; J = \sum_{i=1}^{P} \left\| x(k+i) - x(k+i)_{ref} \right\|_{Q_{ref}}^2 + \sum_{i=1}^{P} \left( \left\| \xi_i^f (x(k+i)) \right\|_{\beta_2}^2 + \| \xi_i^p (x(k+i)) \|_{\beta_3}^2 + \| \xi_i^s (x(k+i)) \|_{\beta_4}^2 \right);$$

where x(k+i) indicates a state of the connected and autonomous vehicle at step k+i, k indicates the current time step, i indicates a number of predicted steps, $x(k+i)_{ref}$ indicates the ecological reference trajectory of the connected and autonomous vehicle, each of $Q_{ref}$, $\beta_2$, $\beta_3$ and $\beta_4$ indicates a penalty weight, and P indicates a prediction time domain.

After solving the tracking target, the control sequence $a_k$, $a_{k+1}$, . . . , $a_{k+P-1}$ in the prediction time domain will be obtained. However, in this example, the Connected and Autonomous Vehicle (CAV) is controlled by only using $a_k$, and in the next time step, the environmental information is re-obtained, the vehicle state information and signal phase and timing information are updated, and the problem is resolved. This is repeated until the Connected and Autonomous Vehicle (CAV) passes through the intersection.

Figure 5:
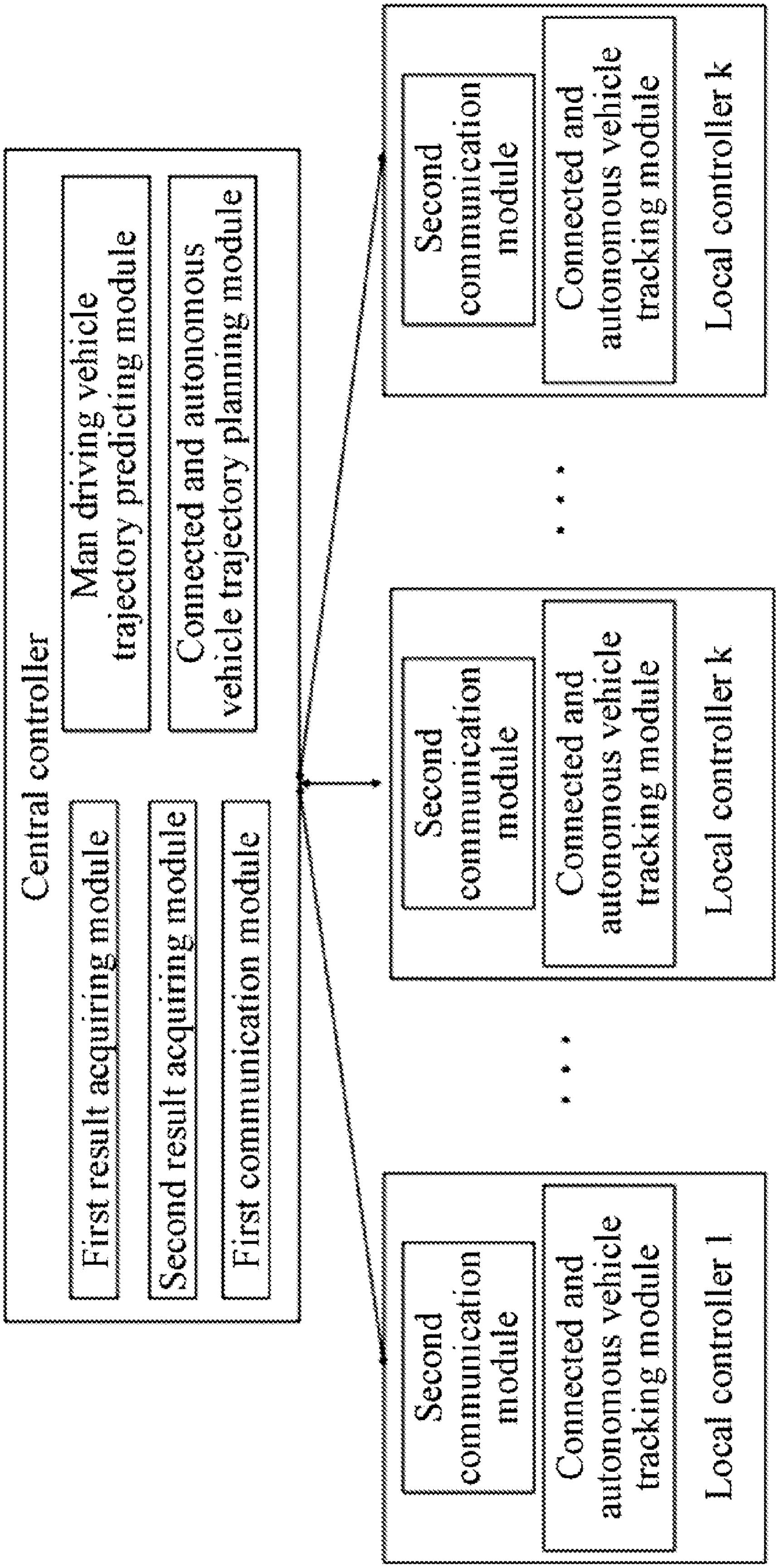
FIG. 5 is a schematic diagram of a mixed traffic flow-oriented vehicle eco-driving control system according to an embodiment of the present disclosure.

As shown in FIG. 5, the embodiment of the present disclosure further provides a mixed traffic flow-oriented vehicle eco-driving control system, which is used to implement the above-mentioned mixed traffic flow-oriented vehicle eco-driving control method, where the system includes: a central controller and a plurality of local controllers deployed on the connected and autonomous vehicle;

The central controller includes a first result acquiring module, a second result acquiring module, a manual-driving vehicle trajectory predicting module, a connected and autonomous vehicle trajectory planning module and a first communication module.

The first result acquiring module is configured to acquire signal phase and timing information, historical vehicle state information and real-time vehicle state information; calculate the gathering wave speed and the dissipation wave speed at the intersection based on a shock wave evolution theory, and obtain the farthest queue point position of the connected and autonomous vehicle at the downstream intersection and the time when the farthest queue is formed.

The second result acquiring module is configured to predict the vehicle state and the time when the connected and autonomous vehicle passes through the stop line based on the farthest queue point position of the connected and autonomous vehicle at the downstream intersection and the time when the farthest queue is formed.

The manual-driving vehicle trajectory predicting module is configured to construct a longitudinal acceleration prediction method of the manual-driving vehicle based on the risk field model, so as to acquire the predicted trajectory of the manual-driving vehicle.

The connected and autonomous vehicle trajectory planning module is configured to take the instantaneous fuel consumption of the vehicle and the penalty for the state of passing through the stop line as the objective function, set dynamic constraints and trajectory constraints of the vehicle, construct and solve the optimal ecological reference trajectory planning model of the connected and autonomous vehicle, and obtain the acceleration curve of the connected and autonomous vehicle, so as to acquire the ecological reference trajectory of the connected and autonomous vehicle.

The first communication module is configured to send the ecological reference trajectory of the connected and autonomous vehicle to the local controller.

The local controller includes a second communication module and a connected and autonomous vehicle tracking module.

The second communication module is configured to receive the ecological reference trajectory of the connected and autonomous vehicle.

The connected and autonomous vehicle tracking module is configured to set a risk factor according to the risk field model and the predicted trajectories of the manual-driving vehicles before and after the connected and autonomous vehicle, construct the tracking target based on the risk factor and the ecological reference trajectory, use the model predictive control for solving, and obtain the control input of the connected and autonomous vehicle.

With regard to the system in the above-mentioned embodiments, the specific way in which each module performs operations has been described in detail in the embodiment of the method, which will not be described in detail here.

Since the system embodiment basically corresponds to the method embodiment, it is only necessary to refer to the partial description of the method embodiment for the relevant details. The system embodiments described above are only schematic, in which the units described as separate components may or may not be physically separated. The components displayed as units may or may not be physical units, that is, the components may be located in one place or distributed to a plurality of network units. Some or all of the modules can be selected according to the actual needs to achieve the purpose of the solution of the present disclosure. Those skilled ordinarily in the art can understand and implement the purpose without creative labor.

Figure 6:
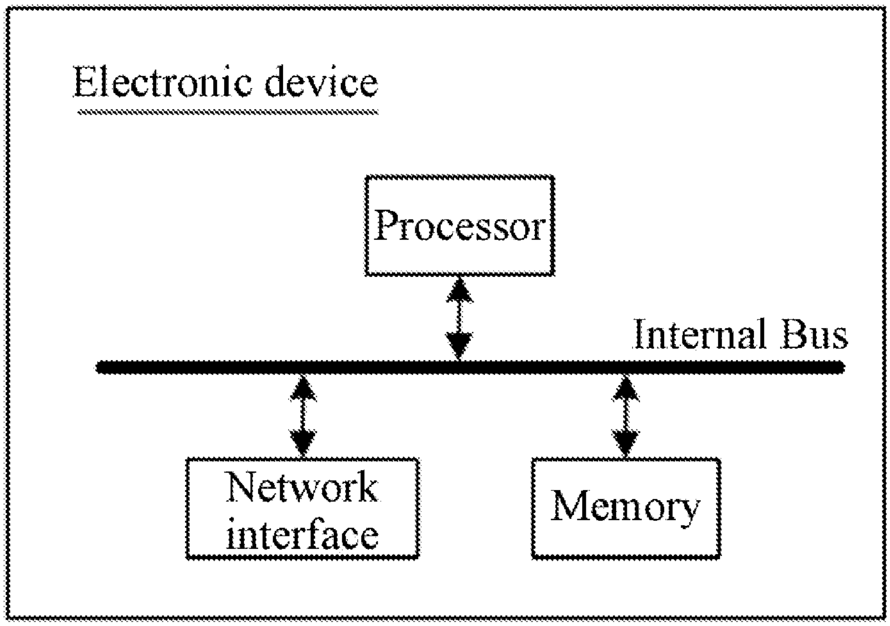
FIG. 6 is a schematic diagram of an electronic device according to an embodiment of the present disclosure.

Correspondingly, the present disclosure further provides an electronic device, including one or more processors; a memory, where the memory is configured to store one or more programs. When executed by the one or more processors, the one or more programs causes the one or more processors to implement the mixed traffic flow-oriented vehicle eco-driving control method as described above. As shown in FIG. 6, FIG. 6 is a hardware structure diagram of any device with data processing capability that implements the mixed traffic flow-oriented vehicle eco-driving control method according to the embodiment of the present disclosure. In addition to the processor, the memory and the network interface shown in FIG. 6, any device with data processing capability where the apparatus in the embodiment is located usually includes other hardware according to the actual functions of the device with data processing capability, which will not be described in detail here.

Correspondingly, the present disclosure further provides a computer-readable storage medium on which computer instructions are stored, where the instructions, when executed by a processor, implements the mixed traffic flow-oriented vehicle eco-driving control method as described above. The computer-readable storage medium can be an internal storage unit of any device with data processing capability as described in any of the previous embodiments, such as a hard disk or a memory. The computer-readable storage medium can also be an external storage device, such as a plug-in hard disk, Smart Media Card (SMC), SD card, Flash Card, etc. provided on the device. Further, the computer-readable storage medium can further include both an internal storage unit and an external storage device of any device with data processing capability. The computer-readable storage medium is used to store the computer program, other programs and data required by any device with data processing capability, and can also be used to temporarily store data that has been output or is to be output.

The above-mentioned embodiments are only used to illustrate the design ideas and characteristics of the present disclosure, and purpose thereof is to enable those skilled in the art to understand the content of the present disclosure and implement the content accordingly. The scope of protection in the present disclosure is not limited to the above-mentioned embodiments. Therefore, all equivalent changes or modifications made according to the principles and design ideas disclosed in the present disclosure fall within the scope of protection of the present disclosure.

What is claimed is:

1. A mixed traffic flow-oriented vehicle eco-driving control method, wherein the mixed traffic flow-oriented vehicle eco-driving control method comprises:

acquiring signal phase and timing information, historical vehicle state information and real-time vehicle state information;

calculating a gathering wave speed and a dissipation wave speed at an intersection based on a shock wave evolution theory, and obtaining a farthest queue point position of a connected and autonomous vehicle at a downstream intersection and a time when a farthest queue is formed;

predicting a vehicle state and a time when the connected and autonomous vehicle passes through a stop line based on the farthest queue point position of the connected and autonomous vehicle at the downstream intersection and the time when the farthest queue is formed;

predicting a longitudinal acceleration of a manual-driving vehicle based on a risk field model, so as to acquire predicted trajectories of the manual-driving vehicle;

taking an instantaneous fuel consumption of the connected and autonomous vehicle and a penalty for a state of passing through the stop line as an objective function, setting dynamic constraints and trajectory constraints of the connected and autonomous vehicle, constructing and solving an optimal ecological reference trajectory planning model of the connected and autonomous vehicle, and obtaining an acceleration curve of the connected and autonomous vehicle, so as to acquire an ecological reference trajectory of the connected and autonomous vehicle;

setting a risk factor according to the risk field model and the predicted trajectories of the manual-driving vehicle before and after the connected and autonomous vehicle, constructing a tracking target based on the risk factor and the ecological reference trajectory, using a model predictive control for solving, and obtaining a control input of the connected and autonomous vehicle; and controlling, based on the control input of the connected and autonomous vehicle, the connected and autonomous vehicle for driving.

2. The mixed traffic flow-oriented vehicle eco-driving control method according to claim 1, wherein the calculating a gathering wave speed $w_1$ and a dissipation wave speed $w_2$ at an intersection comprises:

acquiring a saturation flow $q_s$, a saturation flow density $\rho_s$ and a congestion flow density $\rho_j$ at the intersection according to the historical vehicle state information;

acquiring an arrival flow $q_a$ and an arrival flow density $\rho_a$ according to the real-time vehicle state information;

calculating the gathering wave speed $w_1$ at the intersection, which is expressed as:

$$w_1 = (0 - q_a)/(\rho_j - \rho_a);$$

calculating the dissipation wave speed $w_2$ at the intersection, which is expressed as:

$$w_2 = (q_s - 0)/(\rho_s - \rho_j).$$

3. The mixed traffic flow-oriented vehicle eco-driving control method according to claim 2, wherein the calculating the farthest queue point position at the downstream intersection of the connected and autonomous vehicle and the time when the farthest queue is formed comprises:

acquiring a current queue length $L_0$ according to the signal phase and timing information and the real-time vehicle state information;

calculating a distance $L_{mq}$ between the farthest queue point and the stop line, in which the expression is as follows:

$$L_{mq} = \min\left(w_2 \cdot \frac{w_1(t_g' - t_0) - L_0}{w_2 - w_1}, \frac{N_0}{\rho_j}\right)$$

where $w_1$ is the gathering wave speed, $w_2$ is the dissipation wave speed, $t_g'$ indicates an adjusted green light start time, $t_0$ is a time when a first connected and autonomous vehicle enters the intersection, $\rho_j$ is the congestion flow density, and $N_0$ is a total number of vehicles between the first connected and autonomous vehicle and the stop line;

calculating the farthest queue point position $l_{mq}$ of the connected and autonomous vehicle at the downstream intersection, which is expressed as:

$$l_{mq} = l_s - L_{mq};$$

where $l_s$ indicates a position of the stop line;

calculating the time $t_{mq}$ when the farthest queue is formed, which is expressed as:

$$t_{mq} = -L_{mq}/w_2;$$

wherein the adjusted green light start time comprises:

$$t_g' = \begin{cases} t_g, & t_g < t_r \\ t_g - c, & t_g > t_r \end{cases};$$

where $t_g$ indicates a time when a traffic signal light turns green, $t_r$ indicates a time when the traffic signal light turns red, and c indicates a signal period length.

4. The mixed traffic flow-oriented vehicle eco-driving control method according to claim 3, wherein the predicting a vehicle state and a time when the connected and autonomous vehicle passes through a stop line based on the farthest queue point position of the connected and autonomous vehicle at the downstream intersection and the time when the farthest queue is formed comprises:

acquiring the time $\tilde{t}_f$ when the connected and autonomous vehicle passes through the stop line, in which an expression is as follows:

$$\tilde{t}_f = t_g' + \left(\frac{L_{mq}}{\rho_j} + 1\right) \cdot \frac{1}{q_s};$$

acquiring the vehicle state $\tilde{x}_f$ when the connected and autonomous vehicle passes through the stop line, which is expressed as:

$$\tilde{x}_f = [l_s, v_s]^T;$$

where $v_s$ indicates a speed at which the connected and autonomous vehicle passes through the stop line, that is, a speed of the saturation flow.

5. The mixed traffic flow-oriented vehicle eco-driving control method according to claim 1, wherein the obtaining the farthest queue point position at the downstream intersection of the connected and autonomous vehicle and the time when the farthest queue is formed comprises:

acquiring a current queue length $L_0$ according to the signal phase and timing information and the real-time vehicle state information;

calculating a distance $L_{mq}$ between the farthest queue point and the stop line, in which an expression is as follows:

$$L_{mq} = \min\left(w_2 \cdot \frac{w_1(t_g' - t_0) - L_0}{w_2 - w_1}, \frac{N_0}{\rho_j}\right)$$

where $w_1$ is the gathering wave speed, $w_2$ is the dissipation wave speed, $t_g'$ indicates an adjusted green light start time, $t_0$ is a time when a first connected and autonomous vehicle enters the intersection, $\rho_j$ is a congestion flow density, and $N_0$ is a total number of vehicles between the first connected and autonomous vehicle and the stop line;

calculating the farthest queue point position $l_{mq}$ of the connected and autonomous vehicle at the downstream intersection, which is expressed as:

$$l_{mq} = l_s - L_{mq};$$

where $l_s$ indicates a position of the stop line;

calculating a time $t_{mq}$ when the farthest queue is formed, which is expressed as:

$$t_{mq} = -L_{mq}/w_2;$$

wherein the adjusted green light start time comprises:

$$t_g' = \begin{cases} t_g, & t_g < t_r \\ t_g - c, & t_g > t_r \end{cases};$$

where $t_g$ indicates a time when a traffic signal light turns green, $t_r$ indicates a time when the traffic signal light turns red, and c indicates a signal period length.

6. The mixed traffic flow-oriented vehicle eco-driving control method according to claim 5, wherein the predicting a vehicle state and a time when the connected and autonomous vehicle passes through a stop line based on the farthest queue point position of the connected and autonomous vehicle at the downstream intersection and the time when the farthest queue is formed comprises:

acquiring the time $\tilde{t}_f$ when the connected and autonomous vehicle passes through the stop line, in which the expression is as follows:

$$\tilde{t}_f = t_g' + \left(\frac{L_{mq}}{\rho_j} + 1\right) \cdot \frac{1}{q_s};$$

acquiring the vehicle state $\tilde{x}_f$ when the connected and autonomous vehicle passes through the stop line, which is expressed as:

$$\tilde{x}_f = [l_s, v_s]^T;$$

where $v_s$ indicates a speed at which the connected and autonomous vehicle passes through the stop line, that is, a speed of a saturation flow.

7. The mixed traffic flow-oriented vehicle eco-driving control method according to claim 1, wherein the predicting a longitudinal acceleration of a manual-driving vehicle based on a risk field model, so as to acquire predicted trajectories of the manual-driving vehicle, comprises:

an expression of the longitudinal acceleration of the manual-driving vehicle is as follows:

$$g(t) = l_{i-1}(t) + v_{i-1}(t)\left[T_p - \frac{\eta}{\lambda}\left(\frac{1}{r_d} - 1\right)\right]$$

$$a^f(t) = \max(a_{min}, \min(a_{max}, g(t)));$$

$$g(t) = l_{i-1}(t) + v_{i-1}(t)\left[T_p - \frac{\eta}{\lambda}\left(\frac{1}{r_d} - 1\right)\right] - l_i(t) - v_i(t)T_p - \frac{1}{\lambda}\left(\frac{1}{r_d} - 1\right) - \frac{L_i + L_{i-1}}{2};$$

where $a^f(t)$ indicates the longitudinal acceleration of the manual-driving vehicle, g(t) indicates an acceleration expected by a driver, $a_{min}$ indicates a minimum acceleration of the manual-driving vehicle, $a_{max}$ indicates a maximum acceleration of the manual-driving vehicle, $T_p$ indicates a preview time of the driver, $r_d$ indicates a risk expected by the driver, $\eta$ indicates an influence factor of a speed on the risk, $\lambda$ indicates an influence factor of a distance on the risk, l indicates a position of the vehicle, v indicates a speed of the manual-driving vehicle, l indicates a length of the manual-driving vehicle, t indicates a time, and i indicates a vehicle serial number, in which an (i−1)th vehicle is in front of an i-th vehicle.

8. The mixed traffic flow-oriented vehicle eco-driving control method according to claim 1, wherein the taking an instantaneous fuel consumption of the connected and autonomous vehicle and a penalty for a state of passing through the stop line as an objective function, setting dynamic constraints and trajectory constraints of the connected and autonomous vehicle, constructing and solving an optimal ecological reference trajectory planning model of the connected and autonomous vehicle, and obtaining an acceleration curve of the connected and autonomous vehicle, so as to acquire an ecological reference trajectory of the connected and autonomous vehicle, comprises:

taking the instantaneous fuel consumption of the connected and autonomous vehicle and the penalty for the state of passing through the stop line as the objective function, which is expressed as:

$$\underset{a(t)}{\text{minimize}}\ J = \left\|(x(\tilde{t}_f) - \tilde{x}_f)\right\|_{Q_f}^2 + \alpha_1 \int_{t_0}^{\tilde{t}_f} L(v(t), a(t), t)dt;$$

where $x(\tilde{t}_f)$ indicates the vehicle state of the connected and autonomous vehicle at the time $\tilde{t}_f$ when the vehicle passes through the stop line; $\tilde{x}_f$ indicates the vehicle state that the connected and autonomous vehicle passes through the stop line;

$$\left\|(x(\vec{t}_f) - \tilde{x}_f)\right\|_{Q_f}^2$$

indicates the penalty for the state that the connected and autonomous vehicle passes through the stop line; L(v (t), a(t),t) indicates the instantaneous fuel consumption of the vehicle; v(t) indicates a speed of the connected and autonomous vehicle at time t, and a(t) indicates a acceleration of the connected and autonomous vehicle at time t; each of $Q_f$ and $\alpha_1$ indicates a penalty weight;

setting dynamic constraints of the connected and autonomous vehicle based on a road speed limit, a minimum acceleration and a maximum acceleration of the connected and autonomous vehicle;

the setting trajectory constraints comprises:

a trajectory constraint corresponding to the first connected and autonomous vehicle passing through the stop line being expressed as:

$$l(t_{mq}) \le l_{mq};$$

where $l(t_{mq})$ indicates a position of the connected and autonomous vehicle at time $t_{mq}$;

a trajectory constraint corresponding to a j-th connected and autonomous vehicle passing through the stop line being expressed as:

$$l(t) \le l^p(t);$$

where j is a positive integer greater than or equal to 2, l(t) indicates a position of the connected and autonomous vehicle, and $l^p(t)$ indicates a trajectory of the manual-driving vehicle in front of the connected and autonomous vehicle.

9. The mixed traffic flow-oriented vehicle eco-driving control method according to claim 1, wherein the setting a risk factor according to the risk field model and the predicted trajectories of the manual-driving vehicle before and after the connected and autonomous vehicle, constructing a tracking target based on the risk factor and the ecological reference trajectory, using a model predictive control for solving, and obtaining a control input of the connected and autonomous vehicle, comprises:

setting a risk factor $$\xi_i^f(x(k+i))\xi_i^f(x(k+i))$$

of a following vehicle according to a predicted trajectory of the manual-driving vehicle behind the connected and autonomous vehicle;

setting a risk $$\xi_i^p(x(k+i))\xi_i^p x(k+i)$$

of a preceding vehicle according to a predicted trajectory of the manual-driving vehicle in front of the connected and autonomous vehicle;

setting a risk factor $$\xi_i^s(x(k+i))\xi_i^s(x(k+i))$$

of a traffic signal light;

setting the tracking target and the dynamic constraints of the manual-driving vehicle for solving, to obtain the control input of the connected and autonomous vehicle;

where an expression of the tracking target is:

$$\underset{a_k, a_{k+1}, \cdots, a_{k+P-1}}{\text{minimize}}\ J = \sum_{i=1}^{P} \left\|x(k+i) - x(k+i)_{ref}\right\|_{Q_{ref}}^2$$

$$\underset{a_k,a_{k+1},\dots,a_{k+P-1}}{\text{minimize}} J=\sum_{i=1}^{P}\left\|x(k+i)-x(k+i)_{ref}\right\|_{Q_{ref}}^{2}+\sum_{i=1}^{P}\left(\left\|\xi_i^f(x(k+i))\right\|_{\beta_2}^{2}+\|\xi_i^p(x(k+i))\|_{\beta_3}^{2}+\|\xi_i^s(x(k+i))\|_{\beta_4}^{2}\right);$$

where x(k+i) indicates a state of the connected and autonomous vehicle at step k+i, indicates a current time step, i indicates a number of predicted steps, $x(k+i)_{ref}$ indicates an ecological reference trajectory of the connected and autonomous vehicle, each of $Q_{ref}$, $\beta_2$, $\beta_3$ and $\beta_4$ indicates a penalty weight, and P indicates a prediction time domain.

10. The mixed traffic flow-oriented vehicle eco-driving control method according to claim 1, wherein the control input of the connected and autonomous vehicle is an acceleration value sequence comprising acceleration values at respective time steps within a prediction time domain starting from a current time step, and the controlling, based on the control input of the connected and autonomous vehicle, the connected and autonomous vehicle for driving comprises:

controlling an acceleration of the connected and autonomous vehicle at the current time step based on a first acceleration value in the acceleration value sequence; and proceeding to the acquiring the signal phase and timing information, the historical vehicle state information and the real-time vehicle state information for repeating, to obtain an next acceleration value sequence for controlling the acceleration of the connected and autonomous vehicle at a next time step based on a first acceleration value in the next acceleration value sequence.

11. A mixed traffic flow-oriented vehicle eco-driving control system, said mixed traffic flow-oriented vehicle eco-driving control system comprising:

a central controller; and a plurality of local controllers deployed on the connected and autonomous vehicle;

wherein the central controller comprises:

a first result acquiring module, configured to acquire signal phase and timing information, historical vehicle state information and real-time vehicle state information;

calculate the gathering wave speed and the dissipation wave speed at the intersection based on the shock wave evolution theory, and obtain the farthest queue point position of the connected and autonomous vehicle at the downstream intersection and the time when the farthest queue is formed;

a second result acquiring module, configured to predict the vehicle state and the time when the connected and autonomous vehicle passes through the stop line based on the farthest queue point position of the connected and autonomous vehicle at the downstream intersection and the time when the farthest queue is formed;

a manual-driving vehicle trajectory predicting module, configured to construct a longitudinal acceleration prediction method of the manual-driving vehicle based on the risk field model, so as to acquire predicted trajectory of the manual-driving vehicle;

a connected and autonomous vehicle trajectory planning module, configured to take the instantaneous fuel consumption of the connected and autonomous vehicle and the penalty for the state of passing through the stop line as the objective function, set dynamic constraints and trajectory constraints of the connected and autonomous vehicle, construct and solve the optimal ecological reference trajectory planning model of the connected and autonomous vehicle, and obtain the acceleration curve of the connected and autonomous vehicle, so as to acquire the ecological reference trajectory of the connected and autonomous vehicle; and a first communication module, configured to send the ecological reference trajectory of the connected and autonomous vehicle to a local controller of the plurality of local controllers;

wherein the local controller comprises:

a second communication module, configured to receive the ecological reference trajectory of the connected and autonomous vehicle;

a connected and autonomous vehicle tracking module, configured to set the risk factor according to the risk field model and the predicted trajectories of the manual-driving vehicle before and after the connected and autonomous vehicle, construct the tracking target based on the risk factor and the ecological reference trajectory, use the model predictive control for solving, and obtain the control input of the connected and autonomous vehicle, wherein the local controller is further configured to control, based on the control input of the connected and autonomous vehicle, the connected and autonomous vehicle for driving.

12. The mixed traffic flow-oriented vehicle eco-driving control system according to claim 11, wherein the calculating a gathering wave speed and a dissipation wave speed at an intersection comprises:

acquiring a saturation flow $q_s$, a saturation flow density $\rho_s$ and a congestion flow density $\rho_j$ at the intersection according to the historical vehicle state information;

acquiring an arrival flow $q_a$ and an arrival flow density $\rho_a$ according to the real-time vehicle state information;

calculating the gathering wave speed $w_1$ at the intersection, which is expressed as:

$$w_1=(0-q_a)/(\rho_j-\rho_a);$$

calculating the dissipation wave speed $w_2$ at the intersection, which is expressed as:

$$w_2=(q_s-0)/(\rho_s-\rho_j).$$

13. The mixed traffic flow-oriented vehicle eco-driving control system according to claim 11, wherein the calculating the farthest queue point position at the downstream intersection of the connected and autonomous vehicle and the time when the farthest queue is formed comprises:

acquiring a current queue length $L_0$ according to the signal phase and timing information and the real-time vehicle state information;

calculating a distance $L_{mq}$ between the farthest queue point and the stop line, in which an expression is as follows:

$$L_{mq}=\min\left(w_2\cdot\frac{w_1(t_g'-t_0)-L_0}{w_2-w_1},\ \frac{N_0}{\rho_j}\right)$$

where $w_1$ is the gathering wave speed, $w_2$ is the dissipation wave speed, $t_g'$ indicates an adjusted green light start time, $t_0$ is a time when a first connected and autonomous vehicle enters the intersection, $\rho_j$ is a congestion flow density, and $N_0$ is a total number of vehicles between the first connected and autonomous vehicle and the stop line;

calculating the farthest queue point position $l_{mq}$ of the connected and autonomous vehicle at the downstream intersection, which is expressed as:

$$l_{mq}=l_s-L_{mq};$$

where $l_s$ indicates a position of the stop line;

calculating the time $t_{mq}$ when the farthest queue is formed, which is expressed as:

$$t_{mq}=-L_{mq}/w_2;$$

wherein the adjusted green light start time comprises:

$$t_g'=\begin{cases}t_g, & t_g<t_r\\ t_g-c, & t_g>t_r\end{cases};$$

where $t_g$ indicates a time when a traffic signal light turns green, $t_r$ indicates a time when the traffic signal light turns red, and c indicates a signal period length.

14. The mixed traffic flow-oriented vehicle eco-driving control system according to claim 13, wherein the predicting a vehicle state and a time when the connected and autonomous vehicle passes through a stop line based on the farthest queue point position of the connected and autonomous vehicle at the downstream intersection and the time when the farthest queue is formed comprises:

acquiring the time $\tilde{t}_f$ when the connected and autonomous vehicle passes through the stop line, in which the expression is as follows:

$$\tilde{t}_f=t_g'+\left(\frac{L_{mq}}{\rho_j}+1\right)\cdot\frac{1}{q_s};$$

acquiring the vehicle state $\tilde{x}_f$ when the connected and autonomous vehicle passes through the stop line, which is expressed as:

$$\tilde{x}_f=[l_s,v_s]^T;$$

where $v_s$ indicates a speed at which the connected and autonomous vehicle passes through the stop line, that is, a speed of a saturation flow.

15. The mixed traffic flow-oriented vehicle eco-driving control system according to claim 11, wherein the predicting a longitudinal acceleration of a manual-driving vehicle based on a risk field model, so as to acquire predicted trajectories of the manual-driving vehicle, comprises:

an expression of the longitudinal acceleration of the manual-driving vehicle is as follows:

$$a^f(t)=\max(a_{min},\ \min(a_{max},\ g(t)));$$

$$g(t)=l(t)+v(t)\left[T_p-\frac{\eta}{\lambda}\left(\frac{1}{r_d}-1\right)\right]-l_i(t)-v_i(t)T_p-\frac{1}{\lambda}\left(\frac{1}{r_d}-1\right)-\frac{L_i+L_{i-1}}{2};$$

where $a^f(t)$ indicates the longitudinal acceleration of the manual-driving vehicle, g(t) indicates an acceleration expected by a driver, $a_{min}$ indicates a minimum acceleration of the vehicle, $a_{max}$ indicates a maximum acceleration of the vehicle, $T_p$ indicates a preview time of the driver, $r_d$ indicates a risk expected by the driver, $\eta$ indicates an influence factor of the speed on the risk, $\lambda$ indicates an influence factor of the distance on the risk, l indicates a position of the vehicle, v indicates a speed of the vehicle, L indicates a length of the vehicle, t indicates a time, and i indicates a vehicle serial number, in which the (i−1)th vehicle is in front of the i-th vehicle.

16. The mixed traffic flow-oriented vehicle eco-driving control system according to claim 11, wherein the taking an instantaneous fuel consumption of the connected and autonomous vehicle and a penalty for a state of passing through the stop line as an objective function, setting dynamic constraints and trajectory constraints of the connected and autonomous vehicle, constructing and solving an optimal ecological reference trajectory planning model of the connected and autonomous vehicle, and obtaining an acceleration curve of the connected and autonomous vehicle, so as to acquire an ecological reference trajectory of the connected and autonomous vehicle, comprises:

taking the instantaneous fuel consumption of the vehicle and the penalty for the state of passing through the stop line as the objective function, which is expressed as:

$$\underset{a(t)}{\text{minimize}}\ J=\|(x(t_f)-x_f)\|_{Q_f}^2+\alpha_1\int_{t_0}^{\tilde{t}_f}L(v(t),a(t),t)dt;$$

where $x(\tilde{t}_f)$ indicates the vehicle state of the connected and autonomous vehicle at the time $\tilde{t}_f$ when the connected and autonomous vehicle passes through the stop line; $\tilde{x}_f$ of indicates the vehicle state that the connected and autonomous vehicle passes through the stop line;

$$\|(x(\tilde{t}_f)-\tilde{x}_f)\|_{Q_f}^2$$

indicates the penalty for the state that the connected and autonomous vehicle passes through the stop line; L(v(t), a(t),t) indicates the instantaneous fuel consumption of the connected and autonomous vehicle; v(t) indicates a speed of the connected and autonomous vehicle at time t, and a(t) indicates an acceleration of the connected and autonomous vehicle at time t; each of $Q_f$ and $\alpha_1$ indicates a penalty weight;

setting dynamic constraints of the connected and autonomous vehicle based on a road speed limit, a minimum acceleration and a maximum acceleration of the vehicle;

the setting trajectory constraints comprises:

a trajectory constraint corresponding to the first connected and autonomous vehicle passing through the stop line being expressed as:

$$l(t_{mq})\le l_{mq};$$

where $l(t_{mq})$ indicates a position of the connected and autonomous vehicle at time $t_{mq}$;

a trajectory constraint corresponding to a j-th connected and autonomous vehicle passing through the stop line being expressed as:

$$l(t) \leq l^p(t);$$

where j is a positive integer greater than or equal to 2, l(t) indicates a position of the connected and autonomous vehicle, and $l^p(t)$ indicates a trajectory of the manual-driving vehicle in front of the connected and autonomous vehicle.

17. The mixed traffic flow-oriented vehicle eco-driving control system according to claim 11, wherein the setting a risk factor according to the risk field model and the predicted trajectories of the manual-driving vehicle before and after the connected and autonomous vehicle, constructing a tracking target based on the risk factor and the ecological reference trajectory, using a model predictive control for solving, and obtaining a control input of the connected and autonomous vehicle, comprises:

setting a risk factor $$\xi_i^f(x(k+i))\xi_i^f(x(k+i))$$

of a following vehicle according to a predicted trajectory of the manual-driving vehicle behind the connected and autonomous vehicle;

setting a risk factor $$\xi_i^p x(k+i)\xi_i^p x(k+i)$$

of a preceding vehicle according to a predicted trajectory of the manual-driving vehicle in front of the connected and autonomous vehicle;

setting a risk factor $$\xi_i^s(x(k+i))\xi_i^s(x(k+i))$$

of a traffic signal light;

setting the tracking target and the dynamic constraints of the manual-driving vehicle for solving, to obtain the control input of the connected and autonomous vehicle;

where an expression of the tracking target is:

$$\underset{a_k, a_{k+1}, \cdots, a_{k+P-1}}{\text{minimize}} \quad J = \sum_{i=1}^{P} \left\| x(k+i) - x(k+i)_{ref} \right\|_{Q_{ref}}^2 + \sum_{i=1}^{P} \left( \left\| \xi_i^f(x(k+i)) \right\|_{\beta_2}^2 + \| \xi_i^s(x(k+i)) \|_{\beta_4}^2 \right);$$

where x(k+i) indicates a state of the connected and autonomous vehicle at step k+i, k indicates a current time step, i indicates a number of predicted steps, $x(k+i)_{ref}$ indicates an ecological reference trajectory of the connected and autonomous vehicle, each of $Q_{ref}$, $\beta_2$, $\beta_3$ and $\beta_4$ indicates a penalty weight, and P indicates a prediction time domain.

18. The mixed traffic flow-oriented vehicle eco-driving control system according to claim 11, wherein the control input of the connected and autonomous vehicle is an acceleration value sequence comprising acceleration values at respective time steps within a prediction time domain starting from a current time step, and the controlling, based on the control input of the connected and autonomous vehicle, the connected and autonomous vehicle for driving comprises:

controlling an acceleration of the connected and autonomous vehicle at the current time step based on a first acceleration value in the acceleration value sequence;

wherein the central controller and the local controller repeatedly preform the mixed traffic flow-oriented vehicle eco-driving control method, to obtain an next acceleration value sequence for controlling the acceleration of the connected and autonomous vehicle at a next time step based on a first acceleration value in the next acceleration value sequence.

19. An electronic device comprising:

a memory and a processor, wherein the memory is coupled with the processor, wherein the memory is configured to store program data, and wherein the processor is configured to execute the program data to implement a mixed traffic flow-oriented vehicle eco-driving control method, wherein the mixed traffic flow-oriented vehicle eco-driving control method comprises acquiring signal phase and timing information, historical vehicle state information and real-time vehicle state information;

calculating a gathering wave speed and a dissipation wave speed at an intersection based on a shock wave evolution theory, and obtaining a farthest queue point position of a connected and autonomous vehicle at a downstream intersection and a time when a farthest queue is formed;

predicting a vehicle state and a time when the connected and autonomous vehicle passes through a stop line based on the farthest queue point position of the connected and autonomous vehicle at the downstream intersection and the time when the farthest queue is formed;

predicting a longitudinal acceleration of a manual-driving vehicle based on a risk field model, so as to acquire predicted trajectories of the manual-driving vehicle;

taking an instantaneous fuel consumption of the connected and autonomous vehicle and a penalty for a state of passing through the stop line as an objective function, setting dynamic constraints and trajectory constraints of the connected and autonomous vehicle, constructing and solving an optimal ecological reference trajectory planning model of the connected and autonomous vehicle, and obtaining an acceleration curve of the connected and autonomous vehicle, so as to acquire an ecological reference trajectory of the connected and autonomous vehicle;

setting a risk factor according to the risk field model and the predicted trajectories of the manual-driving vehicle before and after the connected and autonomous vehicle, constructing a tracking target based on the risk factor and the ecological reference trajectory, using a model predictive control for solving, and obtaining a control input of the connected and autonomous vehicle; and controlling, based on the control input of the connected and autonomous vehicle, the connected and autonomous vehicle for driving.

20. The electronic device of claim 19, further comprising a non-transitory computer-readable storage medium on which a computer program is stored, wherein the computer program, when executed by a processor, implements the mixed traffic flow-oriented vehicle eco-driving control method.

* * * * *